United States Patent [19]

Flynn

[11] Patent Number: 5,525,971
[45] Date of Patent: Jun. 11, 1996

[54] INTEGRATED CIRCUIT

[75] Inventor: David W. Flynn, Cambridge, United Kingdom

[73] Assignee: Advanced Risc Machines Limited, Cambridge, United Kingdom

[21] Appl. No.: 296,126

[22] Filed: Aug. 25, 1994

[30] Foreign Application Priority Data

Sep. 23, 1993 [GB] United Kingdom ............ 9319661

[51] Int. Cl.⁶ .......................................... G01R 31/28
[52] U.S. Cl. .......................... 340/825.06; 371/22.1; 371/22.3
[58] Field of Search .................... 364/138, 180, 364/188, 400; 340/870.01, 825.06; 370/13; 395/155; 371/22.1, 22.3

[56] References Cited

U.S. PATENT DOCUMENTS

| | | | |
|---|---|---|---|
| 4,403,287 | 9/1983 | Blahut et al. | 364/200 |
| 4,406,007 | 9/1983 | Kister et al. | 370/13 |
| 4,910,735 | 3/1990 | Yamashita | 371/22.1 |
| 4,947,395 | 8/1990 | Bullinger et al. | 371/22.3 |
| 5,115,435 | 5/1992 | Langford, II et al. | 371/22.3 |
| 5,245,531 | 9/1993 | Kuroiwa | 364/138 |
| 5,260,946 | 11/1993 | Nunally | 371/22.1 |
| 5,373,504 | 12/1994 | Tanaka et al. | 370/13 |
| 5,387,229 | 8/1994 | Holland et al. | 364/138 |
| 5,416,919 | 5/1995 | Ogino et al. | 371/22.1 |
| 5,442,643 | 8/1995 | Adachi | 371/22.1 |

FOREIGN PATENT DOCUMENTS

| | | | |
|---|---|---|---|
| 0023413A1 | 2/1981 | European Pat. Off. | G06F 11/26 |
| 0243113A2 | 10/1987 | European Pat. Off. | G06F 15/06 |

*Primary Examiner*—Brian Zimmerman
*Assistant Examiner*—Edward Merz
*Attorney, Agent, or Firm*—Albert C. Smith

[57] ABSTRACT

An integrated circuit comprises a plurality of data handling devices interconnected to exchange data by an interconnection bus during a first mode of operation; and diagnostic control means, responsive to a diagnostic device external to the integrated circuit, for controlling one or more of the data handling devices to exchange diagnostic data with the diagnostic device via the interconnection bus during a second, diagnostic, mode of operation.

10 Claims, 9 Drawing Sheets

Test mode

D31 　　　　　　　　　　　　　　　　　　　　　　　　　　　　D0

| Parallel 32-bit bus field |
|---|

| xxxxxxxxxxxxxxxxxxxxxx | status field vector |
|---|---|

| Parallel ADDR 32-bit bus field |
|---|

| Parallel DOUT 32-bit bus field |
|---|

| MEM slave address | MEM low order address |
|---|---|

| Parallel DATA 32-bit bus field |
|---|

*Fig. 12*

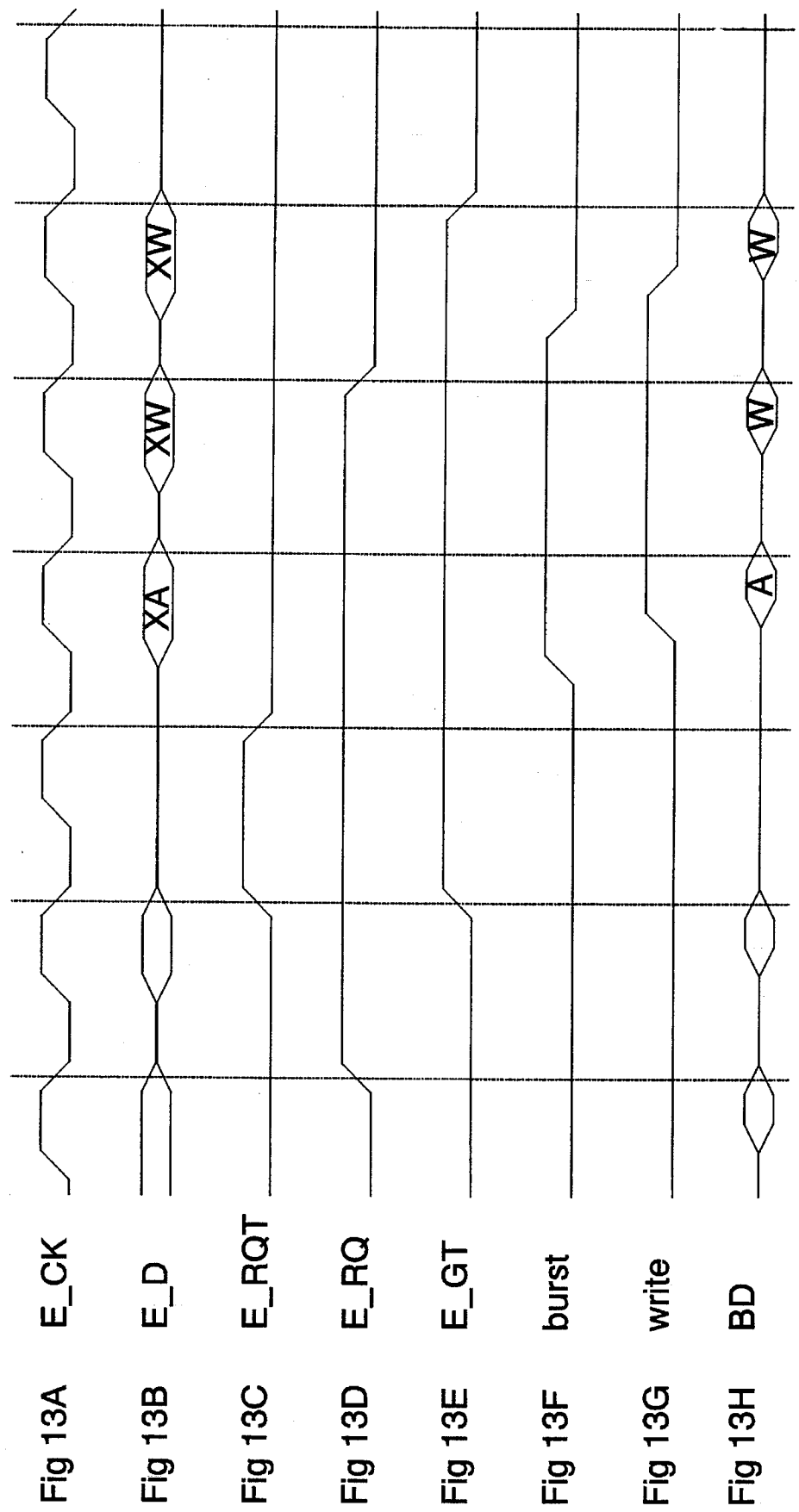

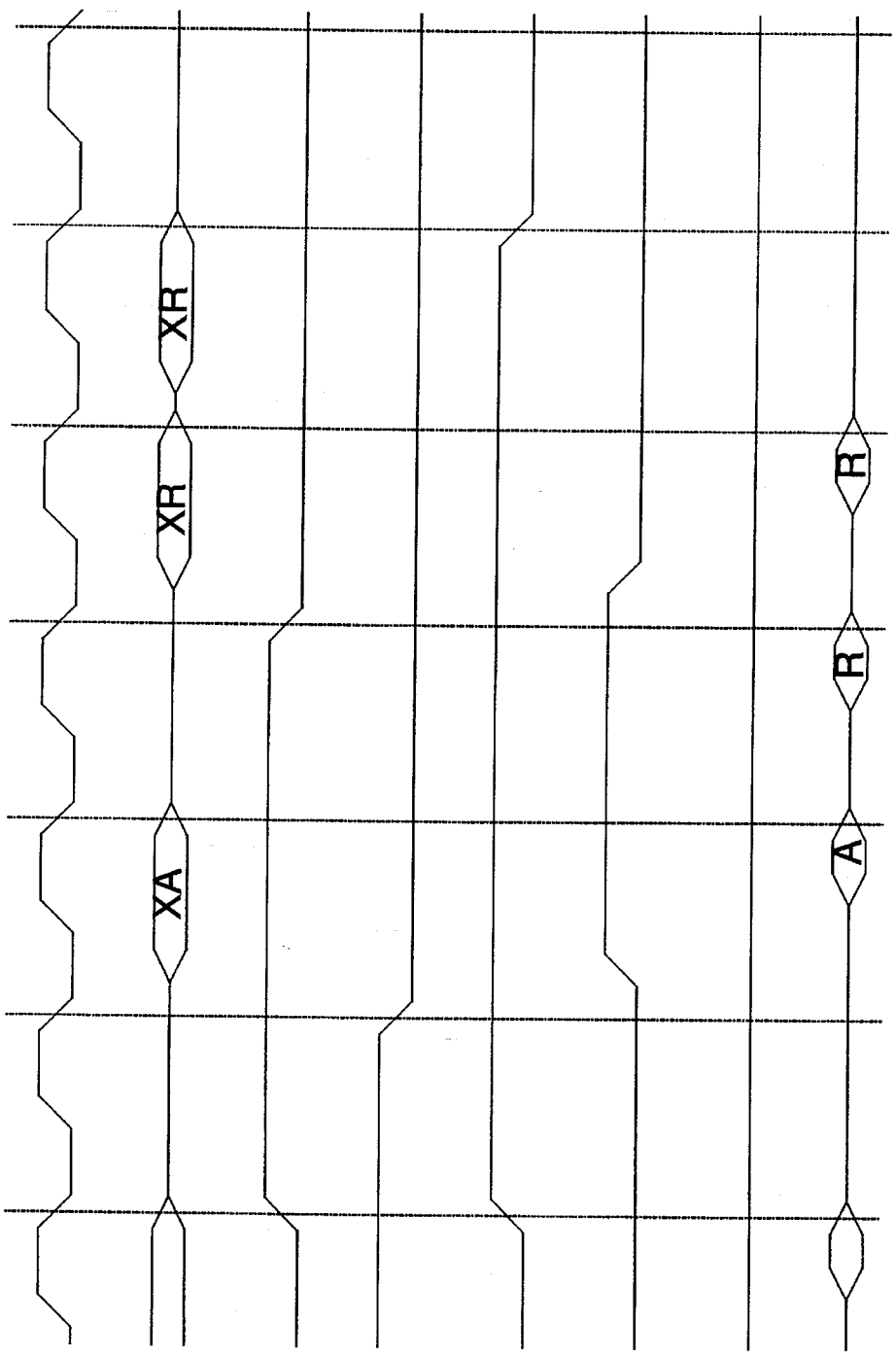

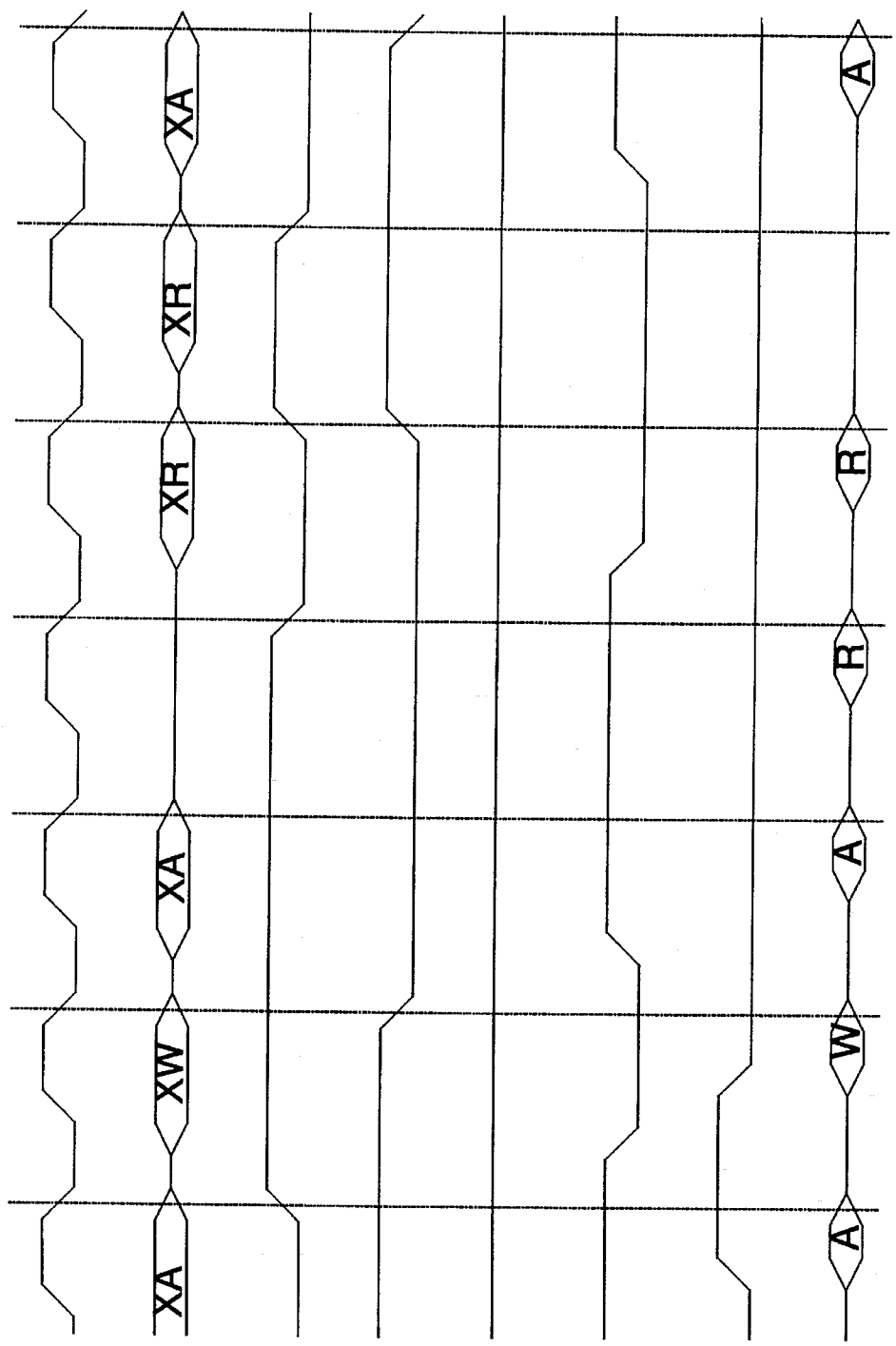

INTEGRATED CIRCUIT

BACKGROUND OF THE INVENTION

1. Field of the Invention

This invention relates to integrated circuits.

2. Description of the Prior Art

Some data processing integrated circuits comprise a number of data handling devices such as a microprocessor, random access memory (RAM), data buffers or other peripheral logic functions, fabricated as a single semiconductor chip. These on-chip data handling devices are interconnected to allow communication of data and control information between the devices, for example by means of a common interconnection bus. The interconnection bus is commonly connected (via a buffering circuit) to input/output terminals of the integrated circuit, to allow communication of data and control information between the on-chip devices and external (off-chip) data handling devices.

This type of integrated circuit can be designed and fabricated in a modular fashion. In this approach, an integrated circuit designer selects From a number of pre-designed modules, each comprising a data handling device, and has only to arrange the relative positions and interconnections of the modules in order to design an integrated circuit for use in a particular application.

It is also known to provide a test or diagnostic access bus to connect each input and output of each on-chip data handling device (or at least an on-chip microprocessor module) to a terminal of the integrated circuit. The test access bus is used to allow testing of the on-chip data handling devices, as part of the manufacturing process. This testing involves an external chip testing device applying test inputs to the on-chip data handling devices via the test access bus, and then detecting the outputs generated by the on-chip data handling devices in response to the test inputs.

However, in a modular integrated circuit of the type described above, the advantages of the modular approach are reduced if the designer is required to provide an external terminal connected to each input and output of each data handling device in order to allow the integrated circuit to be fully tested. For a relatively complex data handling device such as a microprocessor module, the number of such terminals required for that device may be very large. For example, a 32-bit microprocessor may require a test access bus carrying 32-bit address signals, 32-bit data signals, about 13 bits of control signals and about 14 bits of status signals, making a total of 91 terminals.

A previously proposed, but unsatisfactory, solution to this problem is to develop bespoke versions of the test signals to be generated by the chip testing device, for use with individual integrated circuits. These chip-specific test signals are applied to the integrated circuit over a reduced width test access bus. However, the development of such bespoke test signals is time consuming and expensive.

SUMMARY OF THE INVENTION

It is an object of the invention to allow data handling devices in an integrated circuit to be tested without requiring large numbers of test access terminals or bespoke test signal patterns.

This invention provides an integrated circuit comprising: a plurality of data handling devices interconnected to exchange data by an interconnection bus during a first mode of operation; and diagnostic control means, responsive to a diagnostic device external to the integrated circuit, for controlling one or more of the data handling devices to exchange diagnostic data with the diagnostic device via the interconnection bus during a second, diagnostic, mode of operation.

In accordance with the invention, a common bus is used as the integrated circuit's data bus during a first (normal) mode of operation, and as a diagnostic or test access bus during a second (diagnostic) mode of operation. This allows the various modules included in the integrated circuit to be tested, without requiring large numbers of test access terminals or bespoke test signal patterns to be provided.

The skilled man will appreciate that the diagnosis could refer to a manufacturing test process performed on the integrated circuit, but could also refer to post-manufacturing applications such as in-circuit emulation state analysis. For example, the internal contents of an on-chip memory or CPU core may be read out, modified, and written back by an external (off-chip) diagnostic device using the invention. Alternatively, the diagnostic data could simply be internal data indicative of a current processing state of the integrated circuit.

In order to regulate the communication of data on the interconnection bus, it is preferred that the plurality of data handling devices comprises one or more bus master data handling devices and one or more bus slave data/handling devices.

Preferably the diagnostic control means comprises a bus master data handling device. This allows the diagnostic control means to take control of the interconnection bus when required (e.g. during the diagnostic mode of operation).

In anintegrated circuit having a number of potentially competing bus master data handling devices, it is preferable to employ arbitration means, responsive to a request for control of the interconnection bus by one or more of the bus master data handling devices, for allocating control of the interconnection bus to a bus master data handling device in dependence on a predetermined priority order associated with the bus master data handling devices.

In order that the diagnostic control means can take control of the interconnection bus in preference to all other data handling devices in the integrated circuit, it is preferred that the diagnostic control means has a higher priority, in the predetermined priority order, than all other bus master data handling devices connected to the interconnection bus.

Preferably the diagnostic control means comprises means for selectively controlling all other data handling devices connected to the interconnection bus to operate as bus slave devices.

In a preferred embodiment, the diagnostic data comprises one or more successive diagnostic vectors according to a predetermined diagnostic procedure associated with a data handling device under test. Preferably the one or more diagnostic vectors comprise an address vector for selecting a data handling device to be tested.

It is preferred that the integrated circuit is operable under the control of successive cycles of a clocking signal. In this case, it is preferable that the diagnostic control means is responsive to a control signal received from the diagnostic device during a current cycle of the clocking signal, to control one or more of the data handling devices to exchange diagnostic data with the diagnostic device via the interconnection bus during subsequent cycles of the clocking signal. This pipelining of the control signal allows compensation to be made for the time skew between the off-chip and on-chip bus clock timing, and thus allows the interconnection bus to be tested at full bus speed.

Preferably the integrated circuit comprises a data buffer, the data buffer providing an external data bus enabling transfer of data between the interconnection bus and data handling devices external to the integrated circuit; and in which the diagnostic control means is operable to place the external data bus into a high impedance state. This allows the external diagnostic device to control the integrated circuit's external bus to be set to a high impedance state. This effectively temporarily disconnects the integrated circuit from other devices on, for example, a common printed circuit board, and allows those other devices to be tested independently of the disconnected integrated circuit.

Viewed from a second aspect this invention provides a method of operation of an integrated circuit having a plurality of data handling devices interconnected to exchange data by an interconnection bus during a first mode of operation, the method comprising the step of: controlling one or more of the data handling devices to exchange diagnostic data with a diagnostic device external to the integrated circuit via the interconnection bus during a second, diagnostic, mode of operation.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 6 is a schematic illustration of a CPU data vector;

FIG. 7 is a schematic illustration of a CPU status vector;

FIG. 8 is a schematic illustration of a CPU output address vector;

FIG. 9 is a schematic illustration of a CPU output data vector;

FIG. 11 is a schematic illustration of an address select vector for selecting a bus slave device for testing;

FIG. 12 illustrates a 32-bit data vector for reading or writing data patterns to the bus slave device;

FIG. 13 is a timing diagram illustrating a write data burst;

FIG. 14 is a timing diagram illustrating a read data burst; and

FIG. 15 is a timing diagram illustrating a write data burst followed by a read data burst.

DESCRIPTION OF THE PREFERRED EMBODIMENTS

Figure 1:
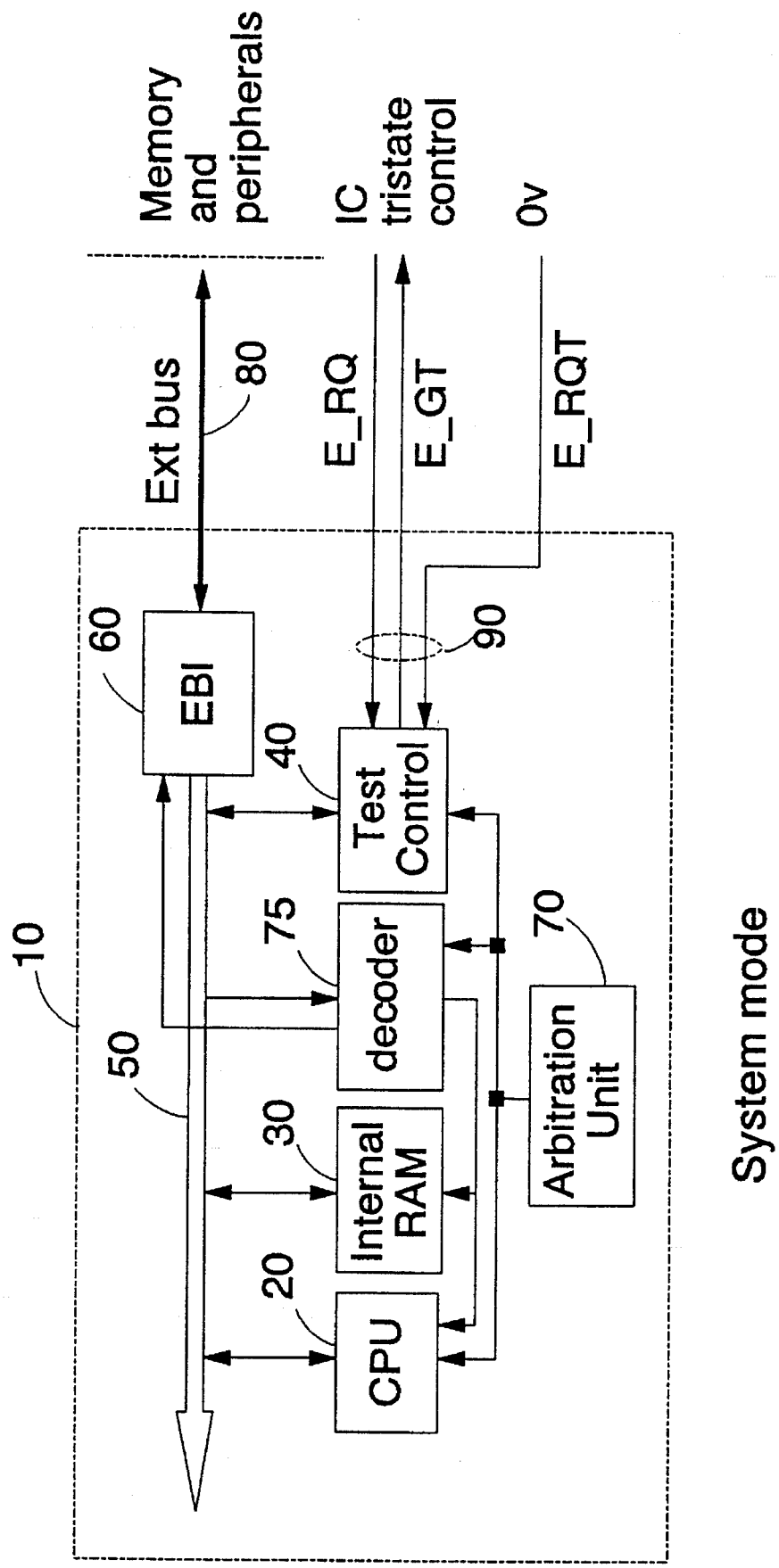
FIG. 1 is a schematic block diagram of an integrated circuit operating in a system mode.

Referring now to FIG. 1, an integrated circuit 10 comprises a microprocessor (CPU) 20, an internal random access memory (RAM) 30 and a test controller 40, all interconnected by an interconnection bus 50. An external bus interface (EBI) 60 provides a buffered interface between the interconnection bus 50 and external (off-chip) memory and peripheral devices.

The integrated circuit 10 is designed and fabricated as a modular structure, so that various other data handling devices may also be included and connected to the interconnection bus 50. In order to regulate the use of the interconnection bus 50, some of the data handling devices are classified as bus 'masters' and the remainder as bus 'slaves'.

The CPU 20 is an example of a bus master. A bus master initiates a data transfer on the interconnection bus 50 by requesting control of the interconnection bus from an arbitration unit 70. The arbitration unit 70 receives requests for temporary control of the interconnection bus 50 from the various bus masters in the system, and allocates control of the interconnection bus 50 to one of the requesting bus masters according to a priority order associated with the bus masters. When the current bus master has completed a bus transaction, or if a higher priority bus master is requesting control of the bus, it relinquishes control of the interconnection bus 50. The arbitration unit 70 is then able to allocate control of the bus to mother requesting bus master.

As mentioned above, the CPU 20 is a bus master, as is the test controller 40. Other examples of bus masters which may be included in the integrated circuit 10 are co-processors such as dedicated digital signal processing (DSP) co-processors, direct memory access (DMA) controllers and diagnostic controllers (e.g. for remote debugging of software).

The internal RAM 30 is an example of a bus slave. A bus slave responds to a slave address, which has been previously allocated to that slave, being placed on the interconnection bus 50 by a bus master, and performs bursts of read or write data cycles under the control of the current bus master. Since bus slaves neither request nor take control of the bus, they are not connected to the arbitration unit 70. Examples of other possible bus slave devices which may be included in the integrated circuit 10 are on-chip read only memory (ROM), interrupt controllers, input/output channel controllers (for example, serial channel controllers), the external bus interface 60 and a system timer unit.

Data communication to and from the various data handling devices (bus masters and bus slaves) is controlled by a decoder 75 connected to the interconnection bus 50, the arbitration unit 70 and the data handling devices.

In FIG. 1, the integrated circuit 10 is illustrated in its normal operation, or 'system' mode. When data communication between the devices takes place in this mode, the current bus master places the address of a recipient data handling device onto the interconnection bus 50. This address is detected by the decoder 75, which supplies a selection signal to the addressed slave device to enable that device for data communication. Also, in system mode, the external bus interface 60 is connected via an external bus 80 to external memory and peripherals.

The test controller 40 also has an external interface (referred to as the test control interface 90).

Figure 2:
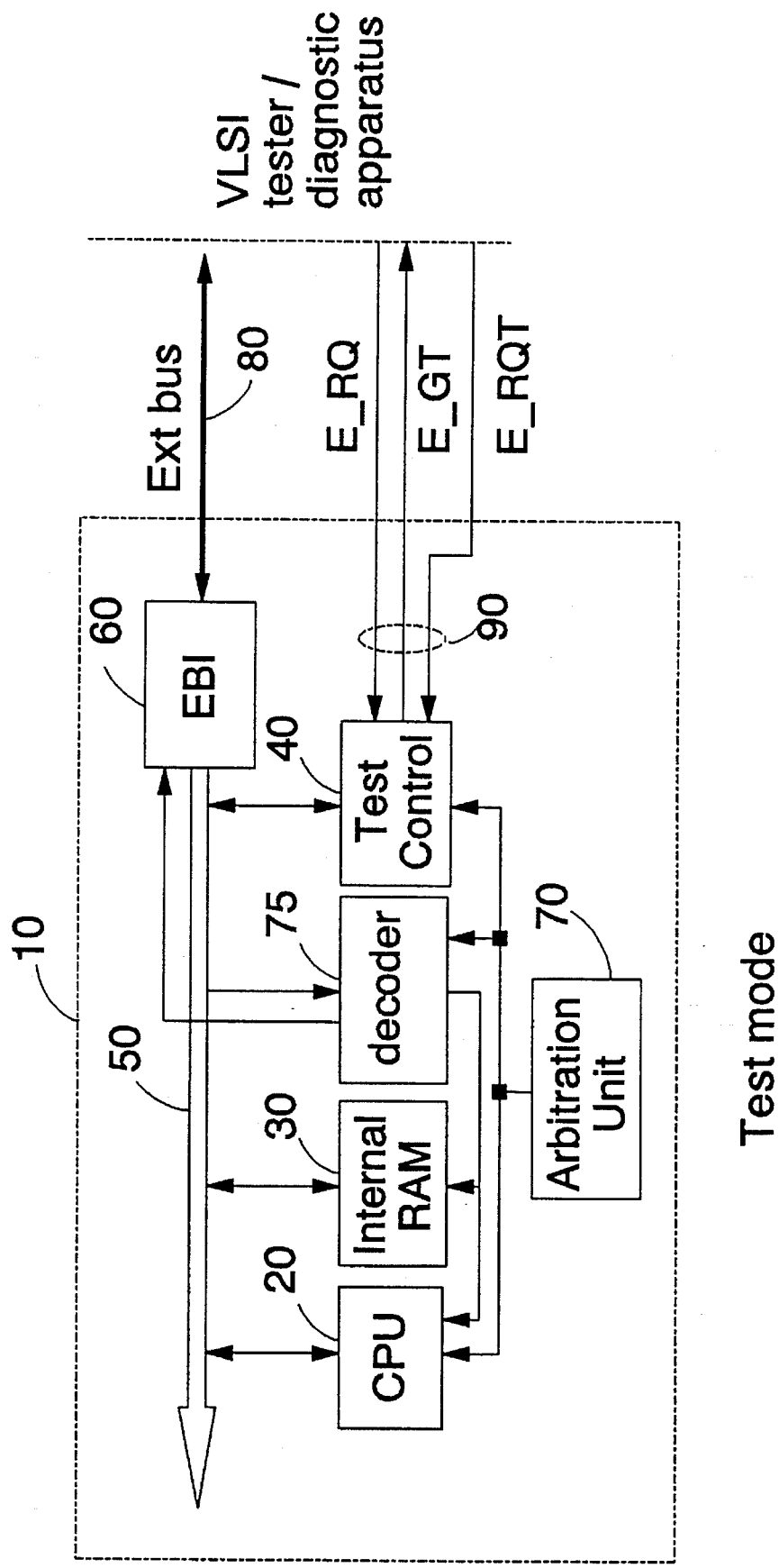
FIG. 2 is a schematic block diagram of an integrated circuit operating in a test mode.

FIG. 2 is a second schematic illustration of the integrated circuit 10 in which the external bus 80 and the test control interface 90 are connected to an integrated circuit testing apparatus, referred to as a VLSI (very large scale integration) tester (not shown) or a diagnostic circuit board tester. This configuration can be used to isolate the integrated circuit 10 from other data processing components (for testing of those other components) or to configure the integrated circuit into a 'test' mode of operation.

In order to isolate the integrated circuit 10, the VLSI tester uses the test control interface 90 to control the test controller 40 to request control of the interconnection bus 50. The test controller 40 is assigned the highest arbitration priority by the arbitration unit 70, and so is guaranteed to be granted control of the interconnection bus 50 within a fixed number of system clock cycles. The test controller 40 indicates that it has acquired control of the interconnection bus 50 by returning an external signal to the VLSI tester via the test control interface 90.

Once the test controller 40 has been granted control of the interconnection bus 50, it controls the external bus interface 60 to place the external bus into a high impedance condition. This effectively disconnects the integrated circuit 10 from other devices on, for example, a common printed circuit board, and allows those other devices to be tested independently.

From this high impedance state, the VLSI tester can then control the test controller 40 to cause the integrated circuit to enter the test mode. In the test mode, the test controller 40 enables data communication to and from the VLSI tester via the external bus interface, effectively allowing the VLSI tester full control of the integrated circuit 10. The test controller 40 also places various control signals on the interconnection bus 50 so that data communication to and from the VLSI tester appears to be taking place with an internal bus master device.

In other words, in the test mode, the external bus 80 becomes a parallel test vector access port. In the present embodiment, the external bus 80 is 32 bits wide and the VLSI tester uses this as a 32-bit parallel access port. However, implementations are possible using a subset of the bits of the external bus 80, or alternatively, in an integrated circuit having a reduced width external bus (for example, a 16 or 8-bit external bus for a 32-bit CPU 20), transmission of the test vectors may be time-multiplexed by the external bus.

In the test mode, the decoder 75 detects the slave address of each device connected to the interconnection bus 50 (i.e. devices which are normally bus masters or bus slaves) and configures that device as a bus slave in a test configuration. For a device which is normally a bus master device, this involves configuring the device as a bus slave.

The VLSI tester then initiates a test vector protocol that intersperses address and control vectors with bursts of reading and writing of test data.

As mentioned above, during the testing process all on-chip devices, whether bus masters or bus slaves, are addressed as though they were bus slave devices, mapped as address spaces within the system memory map. In the case of devices which act as bus masters in normal system mode, the system memory map only allows slave access to the devices when the test controller 40 is the current active bus master.

The test control interface 90 comprises two inputs and one output signal which are used in conjunction with the external bus 80. The three signals of the test control interface 90 provide handshaking between the VLSI tester and the test controller 40. The three signals of the test control interface 90 are:

E_RQ—external bus request input (request tristated bus—i.e. isolation of the integrated circuit 10)

E_RQT—external bus test request input (i.e. the VLSI tester is going to transmit or receive test vectors)

E_GT—external bus grant output (this confirms that control of the interconnection bus has been granted to the test controller 40)

When the integrated circuit is operated in the system mode, asserting the E_RQ line (active high) causes the test controller 40 to request control of the interconnection bus 50 from the arbitration unit 70. The test controller 40 is given the highest priority amongst all of the bus masters in the integrated circuit, and so can be guaranteed to be granted control of the interconnection bus within a predetermined number of clock cycles after requesting control. The test controller 40 controls the external bus interface 60 to place the external bus into a high impedance state, and then informs the VLSI tester that it has been granted control of the bus 50 by asserting the E_GT external grant signal.

In this mode, an external bus controller (e.g. forming part of a diagnostic apparatus or other bus controlling device) connected to the external bus 80 can perform DMA operations on other integrated circuits or devices connected to the external bus 80 (e.g. on a common printed circuit board), because the external bus is guaranteed not to be driven by the integrated circuit 10.

For diagnostic testing of the data handling devices within the integrated circuit 10, the VLSI tester can then assert the E_RQT signal, which indicates to the test controller 40 that the VLSI tester intends to initiate a test process on the integrated circuit 10 itself. In response to the E_RQT signal, the test controller 40 controls the external bus interface 60 to communicate with the VLSI tester.

The external handshake input signals E_RQ and E_RQT are implemented as pipelined signals, applying to the subsequent on-chip cycle rather than the current one. This allows compensation to be made for the time skew between the off-chip and on-chip bus clock timing, and thus allows the interconnection bus 50 to be tested at full bus speed.

The logical sequence to set the external bus interface to a tristated (high impedance or Hi-Z) condition and then to reset the integrated circuit 10 to system mode is illustrated in Table 1 below.

TABLE 1

| E_RQ | E_RQT | E_GT | Description |
|---|---|---|---|
| 0 | 0 | 0 | normal system mode |
| 1 | 0 | 0 | request Hi-Z mode |
| 1 | 0 | 1 | Hi-Z mode |
| 0 | 0 | 1 | exit Hi-Z mode |
| 0 | 0 | 0 | normal system mode again |

Referring to Table 1, when E_RQ, E_RQT and E_GT are all low, the integrated circuit is in normal system mode. The signal E_RQ is then asserted (set high) to request the test controller 40 to take control of the interconnection bus 50 and to set a high impedance mode on the external bus 80. When this request is granted, the signal E_GT is asserted by the test controller 40, to indicate this condition to the VLSI tester.

The E_RQ signal is subsequently returned to a low state in order to terminate the high impedance mode of the external bus 80. When the E_GT signal also returns to a low state this indicates that the test controller 40 has relinquished control of the interconnection bus 50 and the normal system mode applies once again.

A data handling device (a bus master or a bus slave) can be set up for testing as a slave device by placing a slave address corresponding to that device on the external bus 80 and then asserting the signal E_RQT. This causes the decoder 75 to configure the addressed device as a slave device in a test mode, and allows the VLSI tester diagnostic access to that device until the E_RQT and E_RQ signals are both set low.

In the device test mode for bus master devices, a synchronous 32-bit vector read or write protocol is employed to apply test vectors to the addressed device. During this process, the diagnostic handshake on the test control interface 90 uses a Gray-coded sequence of E_RQT and E_RQ to control the operation. This sequence is shown in Table 2 below.

TABLE 2

| E_RQ | E_RQT | E_GT | Description |
| --- | --- | --- | --- |
| 0 | 0 | 0 | normal system mode |
| 1 | 0 | 0 | request Hi-Z mode |
| 1 | 0 | 1 | Hi-Z mode |
| 1 | 1 | 1 | Hi-Z mode, address select |
| 1 | 0 | 1 | Hi-Z mode, vector input |
| 0 | 1 | 1 | Vout mode, vector output |

In the case of vector input in Table 2, a burst of write vectors is permitted from the start address terminated by an address select cycle. Similarly, in the Vout mode, a burst of read vectors is permitted from the start address terminated by an address select cycle.

Figure 3:
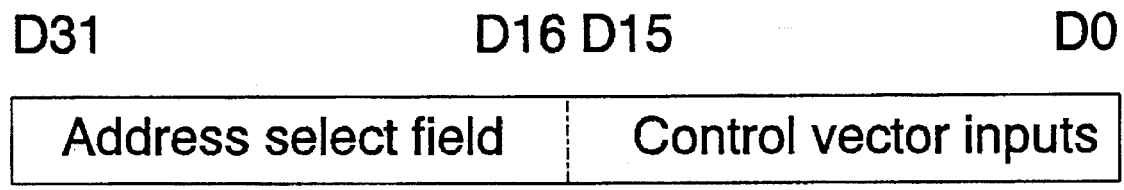
FIG. 3 is a schematic illustration of an address select vector.

FIG. 3 is a schematic illustration of an address select vector applied to the external bus 80. The high order 16-bits (D31 to D16) contain the slave address to select the device to be tested, and the low order bits (D15 to D0) contain control inputs corresponding to the most commonly required control commands for that device.

The decoder 75 responds in the following way to an address vector of the type shown in FIG. 3 being placed on the external bus 80 (and consequently onto the 32 data bits of the interconnection bus 50). The decoder 75 has already received a signal from the arbitration unit 70 indicating that the test controller 40 has been granted control of the interconnection bus 50, and so responds only to the address specified by the high order bits of the address vector. The decoder 75 then configures the device addressed by the address vector as a bus slave device in a test configuration, regardless of whether that device normally acts as a bus master. Setting the test configuration instructs that device to adopt a device configuration specified by the low order bits of the address vector.

When a data handling device has been selected and configured by an address vector, that device then expects to exchange (send or receive) test data vectors with the VLSI tester. The format and order of the test vectors can be determined in advance and are specific to that data handling device or module, regardless of the particular layout and configuration of the integrated circuit 10. The device to be tested therefore acts in a predetermined manner (as a finite state machine) with respect to the VLSI tester, so that the VLSI tester and the device to be tested exchange test data vectors in a predetermined order after that device has been selected.

It should be noted that, in this embodiment, the test controller 40 is the only on-chip device which cannot itself be tested in the manner described above. (The test controller 40 cannot be addressed as a bus slave during the testing procedure, because it is the current bus master at that time). However, a correct mode of operation of the test controller 40 can be deduced by successful test operations being performed on the remaining devices.

Figure 4:
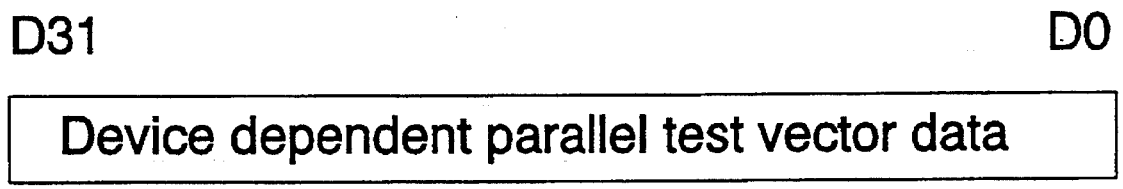
FIG. 4 is a schematic illustration of a test vector comprising device dependent test data.

FIG. 4 is a schematic illustration of a test data vector comprising device dependent test data. In this case, the vectors are free format using all 32 available bits.

During the exchange of address or test data vectors, the test controller generates control signals to be placed on the interconnection bus 50 with data received from the VLSI tester.

Figure 10:
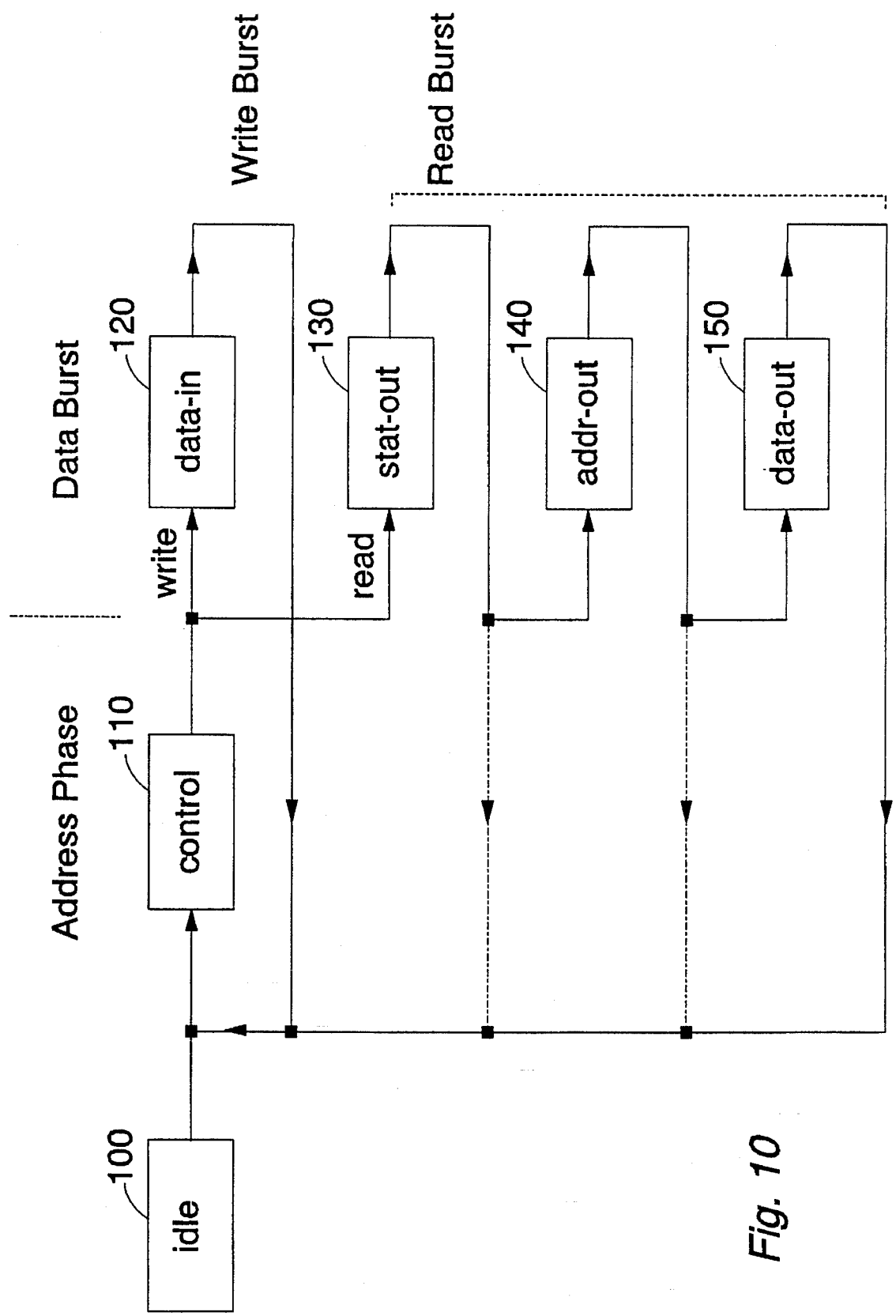
FIG. 10 is a flow chart illustrating a series of steps performed in testing a CPU.

An example of the testing process as applied to the CPU 20 (a bus master) will now be described with reference to FIGS. 5 to 10. Of these figures, FIGS. 5 to 9 illustrate data, control and status vectors applied to the external bus 80 by the VLSI tester at various stages of the testing process. FIG. 10 is a flow chart illustrating the steps performed during the testing process.

Figure 5:
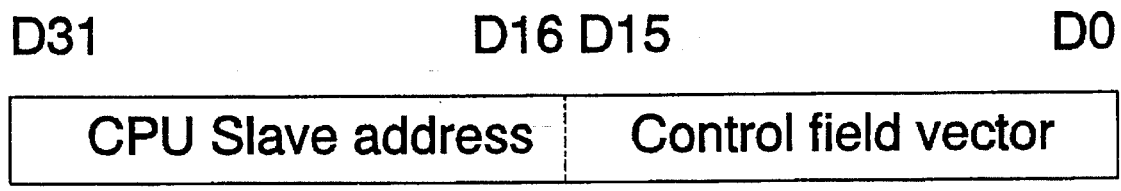
FIG. 5 is a schematic illustration of a CPU address select and control vector.

The test sequence for testing the CPU 20 starts with the VLSI tester generating an address select and control vector illustrated schematically in FIG. 5. As described above, devices which are normally bus masters are addressed as bus slaves during testing by the VLSI tester. Accordingly, the vector of FIG. 5 contains a slave address of the CPU 20 in the high order bits, and control information in the lower bits to configure the CPU 20 for testing.

Once the CPU 20 has been addressed and configured, data may then be applied to the CPU 20 using the full 32 bits of a data vector illustrated schematically in FIG. 6.

Alternatively, data may be read from the CPU 20 by the VLSI tester. These data may indicate the CPU processing status, a current CPU address output, or data returned by the CPU following a processing operation.

The processor status is output as a 14-bit word in the low order bits of a status vector illustrated schematically in FIG. 7. The processor address output may be inspected as a 32-bit ADDR output vector, as illustrated schematically in FIG. 8. Finally, during write operations of the CPU 20, the data output by the processor may be inspected by the VLSI tester as a parallel DOUT data vector illustrated schematically in FIG. 9.

FIG. 10 illustrates the steps performed in testing the CPU 20.

Referring to FIG. 10, from an idle condition 100, the CPU 20 is selected (addressed) using the control vector of FIG. 5 during an address phase. There then follows either a write data burst, during which data are transmitted (at a step 120) to the CPU 20 using a data vector of the form shown in FIG. 6, or a read data burst.

The choice of whether a write burst or a read burst takes place is under the control of the VLSI tester. The VLSI tester sets E_RQT high and E_RQ low for a read burst, and sets E_RQT low and E_RQ high for a write burst (as listed in Table 2 above). These signals are received by the test controller 40, which responds by generating an internal bus write signal when appropriate.

In a read data burst, the CPU statistics are transmitted (at a step 130) to the VLSI tester using a status vector shown in FIG. 7 and then, optionally the CPU address is transmitted (at a step 140) using the ADDR vector illustrated in FIG. 8 and CPU data are transmitted (at a step 150) to the VLSI tester using the DOUT vector of FIG. 9. After each write data burst or read data burst, control is returned to the address phase. In an alternative embodiment, write data bursts and read data bursts may be performed repeatedly at the same slave address until another address vector is output by the VLSI tester.

Devices which are normally bus slaves, such as internal RAM and ROM, are interfaced and tested in a much simpler manner, and allow burst mode writing and reading for test patterns such as 'marching ones' patterns. For use in the testing of such devices, the test controller 40 comprises an address incrementer which supplies sequential addresses to such memory-mapped devices. By employing the address incrementer in the test controller 40, there is no need to provide a pre-loadable counter in each bus slave device.

Rather than providing a full 32-bit incrementer, addresses are incremented over a 12-bit field, while the other bits of the address field (A[31:14] and A[1:0]) must be re-latched at every page boundary. This allows an effective 16 kilobyte burst access window. However, in other embodiments, a 32-bit incrementer could be provided.

FIG. 11 is a schematic illustration of an address select vector for selecting a bus slave device for testing. The high order bits of the vector provide the slave address of the device to be tested (i.e. selecting that device), and the low order bits comprise bits of a memory address corresponding to a memory location within that device.

FIG. 12 illustrates a 32-bit free format data vector for use in reading or writing data patterns to or from the bus slave device to be tested.

FIGS. 13 to 15 are timing diagrams illustrating the testing process performed by the VLSI tester in conjunction with the test controller 40. In particular, FIG. 13 is a timing diagram illustrating a write data burst; FIG. 14 is a timing diagram illustrating a read data burst; and FIG. 15 is a timing diagram illustrating a write data burst followed by a read data burst.

In FIGS. 13 to 15, the following abbreviations are used to represent the various signals involved in the testing process:

| | |
|---|---|
| E_CK | External system clock signal |
| E_D | External bus (80) |
| E_RQT | External bus test request input (90) |
| E_RQ | External bus request input (90) |
| E_GT | External bus grant output (90) |
| burst | A signal indicating that the next cycle on the bus will be a burst data transmission (high) or an address (low) |
| write | Internal bus write control signal |
| BD | Internal bus data |
| XA | External address vector |
| XW | External write vector |
| XR | External read vector |
| A | Internal address vector |
| W | Internal write vector |
| R | Internal read vector |

Referring to FIG. 13, the E_RQ signal is first asserted by the VLSI tester. When control of the interconnection bus 50 has been granted to the test controller 40, the test controller asserts the E_GT signal. The VLSI tester sets the E_RQT signal for one clock cycle to initiate the test mode, and then transmits an external address vector (XA) followed by two external write vectors (XW). These are passed to the interconnection bus 50 by the external bus interface 60 as internal address (A) and write (W) vectors respectively.

In response to the internal address vector, the decoder 75 selects the device to be tested and configures that device as a bus slave in a test configuration. That device then receives the internal write vectors (corresponding to the external write vectors generated by the VLSI tester) and responds to those vectors in a manner dependent on that device or module.

The testing process of FIG. 13 is terminated when the test controller 40 resets the E_GT signal to a low state.

FIG. 14 is similar to FIG. 13, but illustrates a read data burst, in which data are read from an internal device and transmitted to the VLSI tester. In this case, the external bus interface 60 receives an external address vector (XA) and, in response to this, places a corresponding internal address vector (A) on the internal bus. Internal read vectors (R) from the device under test are then transmitted to the VLSI tester via the external bus 80 as external read vectors (XR).

Finally, fibre 15 illustrates a data write burst similar to that shown in FIG. 13, followed immediately by a data read burst similar to that shown in FIG. 14.

The embodiment described above is not limited to use during basic manufacturing testing of integrated circuits. The testing techniques may also be used in applications such as in-circuit emulation state analysis. For example, the internal contents of an on-chip memory or CPU core may be read out, modified, and written back using these techniques.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An integrated circuit comprising:
a plurality of data handling devices interconnected to exchange data by an interconnection bus during a first mode of operation, said data handling devices comprising one or more bus master data handling devices and one or more bus slave data handling devices; and
diagnostic control means, responsive to a diagnostic device external to said integrated circuit, comprising a diagnostic bus master data handling device for controlling one or more of said data handling devices to exchange diagnostic data with said diagnostic device via said interconnection bus during a second, diagnostic, mode of operation.

2. An integrated circuit according to claim 1, comprising:
arbitration means, responsive to a request for control of said interconnection bus by one or more of said bus master data handling devices, for allocating control of said interconnection bus to a bus master data handling device in dependence on a predetermined priority order associated with said bus master data handling devices.

3. An integrated circuit according to claim 2, in which said diagnostic control means has a higher priority, in said predetermined priority order, than all other bus master data handling devices connected to said interconnection bus.

4. An integrated circuit according to claim 1, in which said diagnostic control means comprises means for selectively controlling all other data handling devices connected to said interconnection bus to operate as bus slave devices.

5. An integrated circuit according to claim 1, in which said diagnostic data comprises one or more successive diagnostic vectors according to a predetermined diagnostic procedure associated with a data handling device under test.

6. An integrated circuit according to claim 5, in which the one or more diagnostic vectors comprise an address vector for selecting a data handling device to be tested.

7. An integrated circuit according to claim 1, in which said integrated circuit is operable under the control of successive cycles of a clocking signal.

8. An integrated circuit according to claim 7, in which said diagnostic control means is responsive to a control signal received from the diagnostic device during a current cycle of the clocking signal, to control one or more of said data handling devices to exchange diagnostic data with said diagnostic device via said interconnection bus during subsequent cycles of said clocking signal.

9. An integrated circuit according to claim 1, comprising a data buffer, said data buffer providing an external data bus enabling transfer of data between said interconnection bus and data handling devices external to said integrated circuit; and in which said diagnostic control means is operable to place said external data bus into a high impedance state.

10. A method of operation of an integrated circuit having a plurality of data handling devices interconnected to exchange data by an interconnection bus during a first mode of operation, said data handling devices comprising one or more bus master data handling devices and one or more bus slave data handling device said method comprising the step of:

controlling one or more of said data handling devices with a diagnostic bus master data handling device to exchange diagnostic data with a diagnostic device external to said integrated circuit via said interconnection bus during a second, diagnostic, mode of operation.

* * * * *